United States Patent [19]
Littlefield

[11] Patent Number: 5,133,105
[45] Date of Patent: Jul. 28, 1992

[54] "V" FILTER CLEANING LANCE
[75] Inventor: Robert G. Littlefield, Vienna, Va.
[73] Assignee: Ingersoll-Rand Company, Woodcliff Lake, N.J.
[21] Appl. No.: 719,386
[22] Filed: Jun. 24, 1991
[51] Int. Cl.⁵ ................................. A47L 5/14
[52] U.S. Cl. .................................. 15/405; 15/410; 15/415.1
[58] Field of Search .................... 15/405, 415.1, 410

[56] References Cited
U.S. PATENT DOCUMENTS

| | | | |
|---|---|---|---|
| 243,098 | 6/1881 | Becker et al. | 15/415.1 |
| 1,103,484 | 7/1914 | Clarke | 239/532 X |
| 1,164,940 | 12/1915 | Jackson | 239/566 X |
| 1,656,208 | 1/1928 | Le Vora | 15/401 X |
| 1,728,113 | 9/1929 | Fertally | 15/405 X |
| 1,747,258 | 2/1930 | O'Neil | 15/401 X |
| 1,863,685 | 6/1932 | Covey | 239/566 X |
| 2,263,070 | 11/1941 | Cusick | 15/345 X |
| 2,337,087 | 12/1943 | Deck | 239/566 X |
| 3,020,579 | 2/1962 | O'Connor | 239/566 X |
| 4,360,949 | 11/1982 | Wilson | 15/405 |

Primary Examiner—Chris K. Moore
Attorney, Agent, or Firm—Walter C. Vliet

[57] ABSTRACT

A filter cleaning lance having a fast acting valve on a handle portion and an extension portion which terminates in a distributor disposed at essentially right angles to the extension portion. The distributor is further provided with a series of nozzles directed perpendicularly from a plane in which both the distributor and the extension handle lie so as to efficiently clean a filter surface having limited access.

7 Claims, 1 Drawing Sheet

"V" FILTER CLEANING LANCE

BACKGROUND OF THE INVENTION

This invention relates generally to methods and apparatus for cleaning filters, and more particularly to a compressed air cleaning lance for cleaning V-pack filters, or the like, commonly used with air conditioning and off-road vehicle filters and the like. In the past, such filters have been found to be difficult to clean with conventional air guns because of the single point concentration and lack of accessibility to the interior of the V-pack type filter.

Thus, it is apparent that it would be advantageous to provide an alternative directed at overcoming one or more of the limitations set forth above. Accordingly, a suitable alternative is provided including features more fully disclosed hereinafter.

SUMMARY OF THE INVENTION

In one aspect of the present invention this is accomplished by a V-pack filter cleaning lance comprising a connection for receiving a source of pressure fluid; a valve means communicating with said connection for selectively conducting pressure fluid received by said connector; a conduit means communicating with said valve for directing pressure fluid from said valve means to a remote point; a distributor means for receiving and communicating with said conduit means at said remote point selectively delivering pressure fluid substantially, said distributor means being disposed substantially perpendicular to said conduit means and having provided therein nozzle means for expelling said pressure fluid at angles substantially perpendicular to said distributor means, and said conduit means to effect cleaning of a filter surface disposed substantially parallel to both said distributor means and said conduit means.

The foregoing and other aspects will become apparent from the following detailed description of the invention when considered in conjunction with the accompanying drawing figures.

DETAILED DESCRIPTION

Figure 1:
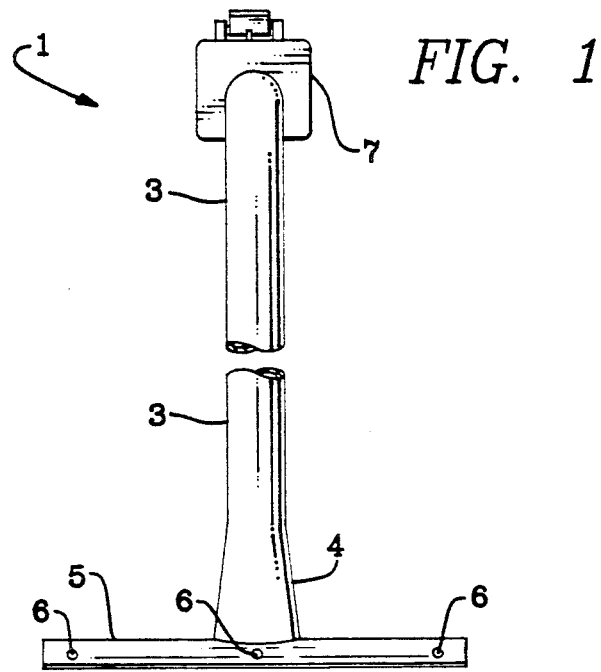
FIG. 1 is a front elevation showing the present invention.
Figure 2:
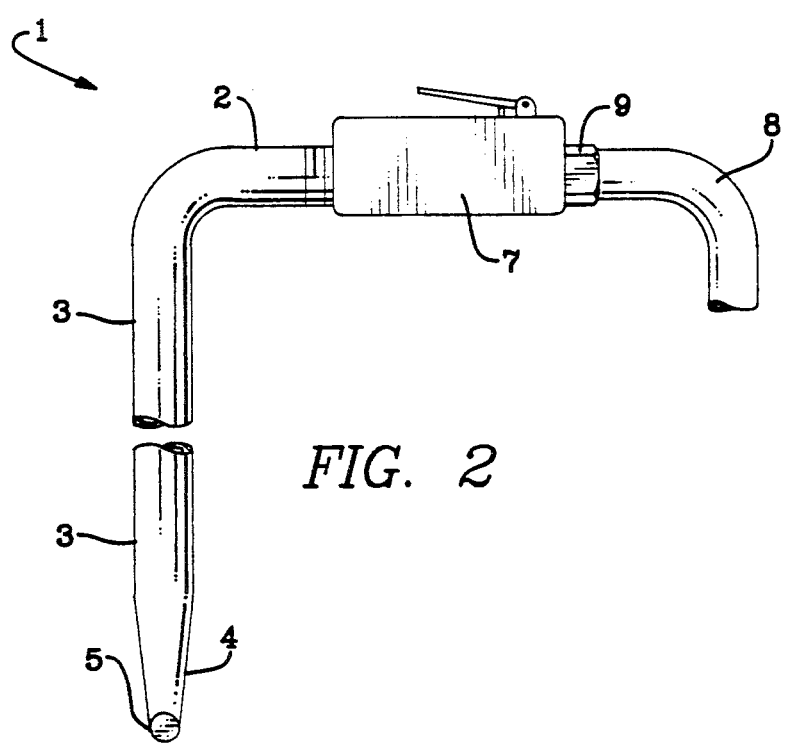
FIG. 2 is a side elevation showing the present invention.

Referring to FIGS. 1 and 2, the cleaning lance generally indicated by reference numeral 1 is formed from a piece of vent pipe having a handle portion 2 and an extension portion 3. The extension portion 3 has a flattened section 4 towards the opposite end of the handle section 2 to which is attached a distributor pipe 5. The distributor pipe 5 is provided with a series of air nozzle perforations 6. A convenient valve means such as, for example, a fast opening, full flow, release shut-off lever operated valve 7, is attached to the handle 2. A source of pressure fluid, such as compressed air, is provided through an air hose 8 by means of a connector 9 to the valve 7.

Figure 3:
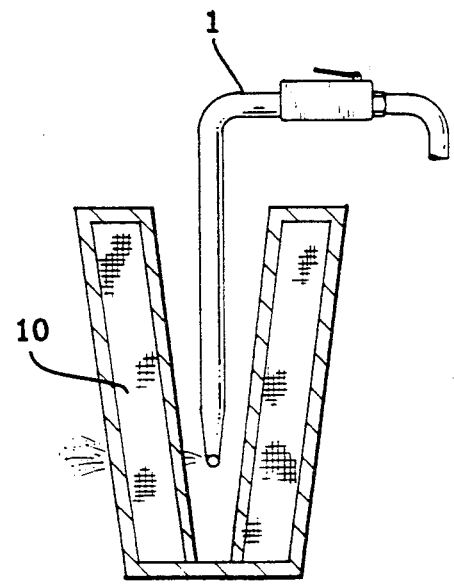
FIG. 3 shows the present invention inserted for use in a V-pack filter.

It can be appreciated by one skilled in the art that when the valve 7 is opened, compressed air is introduced to the hollow interior of the lance handle and thereafter is supplied through the extension to the distributor and hence to the air nozzles 6 where air is expelled perpendicular to the plane formed by the lance and the distributor. The blasts of air exiting the nozzles 6 are utilized to clean, for example, a "V" type air filter 10 as shown in FIG. 3.

In the embodiment shown, a convenient size has been found to include a handle, approximately 3 inches long, and an extension of approximately 38 inches long made with ½" Schedule 40 stainless steel pipe joined by means of a formed saddle with a piece of ¼" Schedule 40 stainless steel pipe plugged off at both ends to act as a distributor. The distributor length has been conveniently chosen at about 3¾" and each of the three nozzles, as shown in FIG. 1, is comprised of a 7/64" diameter hole, one hole being located at approximately ¼" from each end of the distributor and one at the center. This configuration has been found to be particularly useful for cleaning the V-Pack Filters found in the M1 family of military tanks. The extension provides sufficient length to cleaning the bottom of the V-pack filter and the chosen length of the distributor and spacing of the nozzles is effective in cleaning between the ribs of the filters.

The lance is designed to pass approximately 50 ACFM of air at 90 PSIG through the valve. In operation, the lance is inserted inside the V-pack filter. The jets of air blow the dust-laden filter packs from clean side out the dirty side. After cleaning, the filters can be reused. The holes in the distributor are spaced to provide width as the lance is passed up and down the inside of the filter, and to also bridge reinforcing material inside of the filter media. This provides full utilization of the impact and flow of the air jets.

Having described the invention, what is claimed is:

1. A V-pack filter cleaning lance comprising:
   an elongate handle having a connection for receiving a source of pneumatic pressure fluid;
   a valve in the gripping area in said handle communicating with said connection for selectively conducting pressure fluid received by said connector;
   a tubular conduit communicating with said valve for directing pressure fluid from said valve to a remote point;
   an elongate hollow distributor communicating with said conduit at said remote point for receiving and selectively delivering pressure fluid to a filter media to be cleaned;
   said distributor being disposed substantially perpendicular to said conduit and having provided therein nozzle means for expelling said pressure fluid at angles substantially perpendicular to said distributor and said conduit to effect cleaning of a filter surface by directing and passing pressure fluid through said filter media, said filter media being disposed in a plane substantially parallel to a plane including both said distributor and said conduit; and
   said handle being further provided with a means for fixing orientation of said handle in a plane perpendicular to said tubular conduit to facilitate convenient control and orientation for filter access during traversing cleaning movements.

2. A V-pack filter cleaning lance according to claim 1, wherein said valve further comprises a fast acting lever operated valve.

3. A V-pack filter cleaning lance according to claim 1, wherein said conduit includes a handle section and an extension section.

4. A V-pack filter cleaning lance according to claim 3, wherein said handle section is approximately 3 to 6 inches long and said extension section is approximately 38 inches long.

5. A V-pack filter cleaning lance according to claim 1, wherein said distributor is approximately 3¾" long and is provided with three nozzles being located at approximately ¼" from each end and at the center of the distributor.

6. A V-pack filter cleaning lance according to claim 5, wherein said distributor holes are approximately 7/64" in diameter and sized to handle approximately 50 ACFM of air flow at 90 PSIG.

7. A V-pack filter cleaning lance according to claim 1, wherein said conduit and said distributor are formed from Schedule 40 stainless steel pipe.

* * * * *